(12) United States Patent
Hashimoto et al.

(10) Patent No.: US 12,395,077 B2
(45) Date of Patent: Aug. 19, 2025

(54) SERIES CAPACITOR STEP-DOWN CONVERTER, CONTROLLER CIRCUIT THEREOF, AND CONTROL METHOD

(71) Applicant: ROHM Co., LTD., Kyoto (JP)

(72) Inventors: Kazuki Hashimoto, Kyoto (JP); Akihiro Kawano, Kyoto (JP)

(73) Assignee: ROHM Co., LTD., Kyoto (JP)

( * ) Notice: Subject to any disclaimer, the term of this patent is extended or adjusted under 35 U.S.C. 154(b) by 237 days.

(21) Appl. No.: 18/343,048

(22) Filed: Jun. 28, 2023

(65) Prior Publication Data

US 2024/0006991 A1  Jan. 4, 2024

(30) Foreign Application Priority Data

Jun. 30, 2022 (JP) .................................. 2022-106109

(51) Int. Cl.
*H02M 3/07* (2006.01)
*H02M 1/00* (2007.01)
*H02M 1/38* (2007.01)
*H02M 3/158* (2006.01)

(52) U.S. Cl.
CPC .......... *H02M 3/07* (2013.01); *H02M 1/0058* (2021.05); *H02M 1/38* (2013.01); *H02M 3/1586* (2021.05)

(58) Field of Classification Search
CPC ........ H02M 1/0058; H02M 1/38; H02M 3/07; H02M 3/1586
See application file for complete search history.

(56) References Cited

U.S. PATENT DOCUMENTS

| 2013/0154600 A1* | 6/2013 | Giuliano | H02M 3/1584 323/304 |
| 2021/0075323 A1* | 3/2021 | Jin | H02M 3/01 |
| 2022/0115953 A1* | 4/2022 | Rainer | H02M 3/1584 |
| 2023/0412079 A1* | 12/2023 | Parto | H02M 1/0009 |

OTHER PUBLICATIONS

Stefano Saggini, Shuai Jiang, Mario Ursino, Chenhao Nan, 'A 99% Efficient Dual-Phase Resonant Switched-Capacitor-Buck Converter for 48 V Data Center Bus Conversions,' 2019 IEEE Applied Power Electronics Conference and Exposition (APEC). https://www.semanticscholar.org/paper/A-99-Efficient-Dual-Phase-Resonant-Converter-for-48-Saggini-Jiang/5a7627a49f99c71b67007a8df1eff7b8a766f22b.

* cited by examiner

*Primary Examiner* — Jue Zhang
(74) *Attorney, Agent, or Firm* — CHIP LAW GROUP

(57) ABSTRACT

Provided is a controller circuit of a series capacitor step-down converter, the series capacitor step-down converter including an input line and an output line, a first switch, a coupled inductor, a second switch, a series capacitor, a third switch, a fourth switch, and an output capacitor, the controller circuit being configured to alternately switch between a first state in which the first switch and the fourth switch are on and a second state in which the second switch and the third switch are on while interposing a dead time between the first state and the second state, and turn on the second switch ahead of the third switch before a direction of a current of the first inductor is reversed in the dead time during a transition from the first state to the second state.

13 Claims, 15 Drawing Sheets

SERIES CAPACITOR STEP-DOWN CONVERTER, CONTROLLER CIRCUIT THEREOF, AND CONTROL METHOD

CROSS REFERENCE TO RELATED APPLICATIONS

This application claims priority benefit of Japanese Patent Application No. JP 2022-106109 filed in the Japan Patent Office on Jun. 30, 2022. Each of the above-referenced applications is hereby incorporated herein by reference in its entirety.

BACKGROUND

The present disclosure relates to a series capacitor converter.

A direct current (DC)/DC converter having a step-down function is used to generate a voltage lower than an input voltage. Known as the DC/DC converter having the step-down function are a step-down (Buck) type, a step-up/down type, a Cuk type, a Zeta type, a Sepic type, and the like.

Depending on applications, an interleaved type or a series capacitor type as a variation of a step-down converter is employed. The interleaved type is obtained by connecting Buck converters in parallel with each other, and commonly connecting inputs thereof and commonly connecting outputs thereof. A high-efficiency operation is realized by interleaved operation of a plurality of Buck converters. The interleaved type has a same step-down ratio as an ordinary buck converter.

A step-down converter of the series capacitor type can be considered to be a modification of the interleaved type in which the number of phases is two. The step-down converter of the series capacitor type has a configuration to which a series capacitor is added. The step-down converter of the series capacitor type can reduce the step-down ratio to ½ times that of the interleaved type, and is therefore suitable for an application that requires a small step-down ratio.

An example of the related art is disclosed in "Stefano Saggini, Shuai Jiang, Mario Ursino, Chenhao Nan, 'A99% Efficient Dual-Phase Resonant Switched-Capacitor-Buck Converter for 48 V Data Center Bus Conversions,' 2019 IEEE Applied Power Electronics Conference and Exposition (APEC)."

DETAILED DESCRIPTION

Outline of Embodiments

Figure 1:
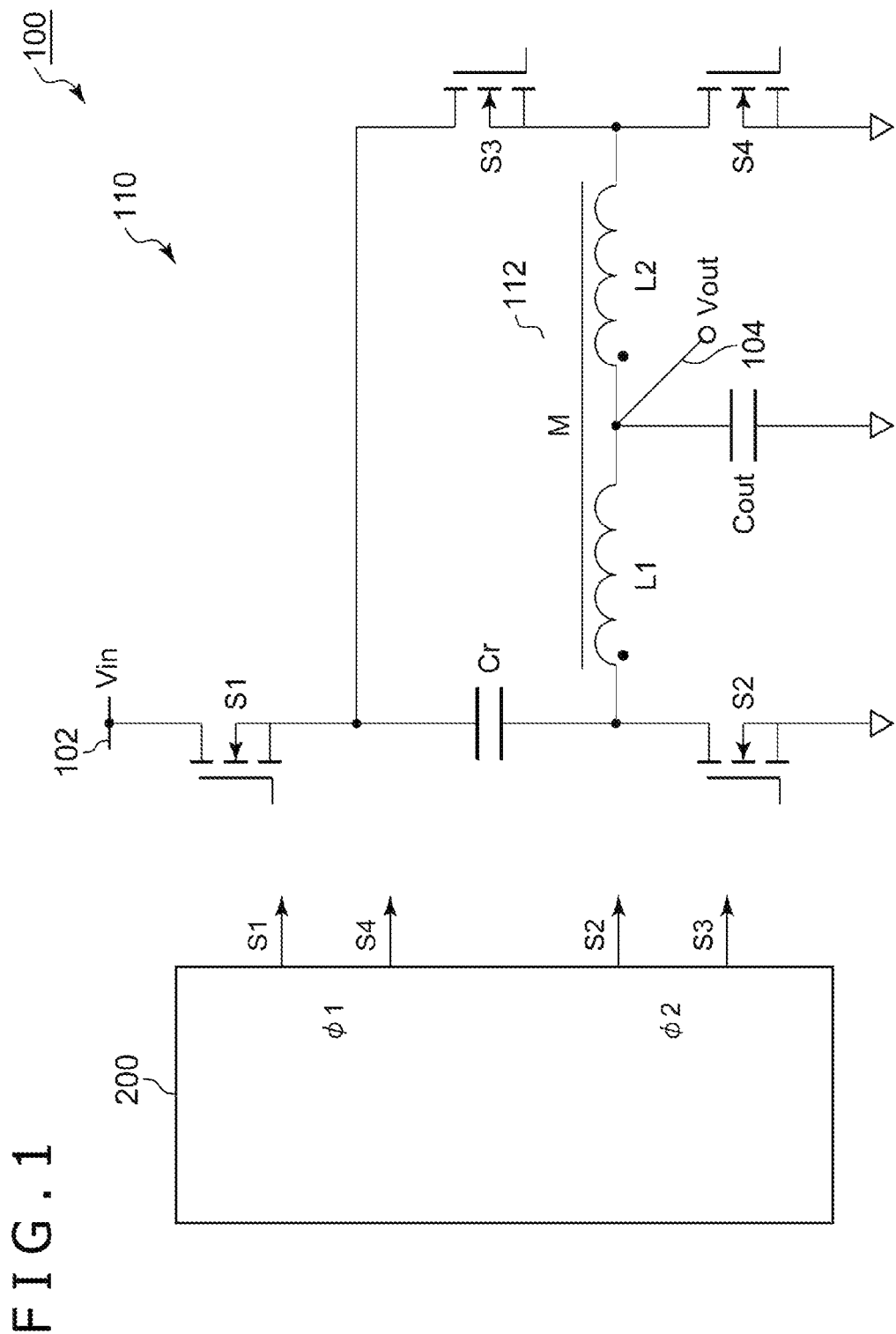
FIG. 1 is a circuit diagram of a series capacitor step-down converter according to an embodiment.

An outline of a few illustrative embodiments of the present disclosure will be described. This outline describes, in a simplified manner, a few concepts of one or a plurality of embodiments as an introduction to the following detailed description for a purpose of basic understanding of the embodiments, and does not limit the scope of the disclosure. This outline is neither a comprehensive outline of all conceivable embodiments nor intended to identify important elements of all of the embodiments or demarcate the scope of a part or all of aspects. For convenience, "one embodiment" may be used to refer to one embodiment (an example or a modification) or a plurality of embodiments (examples or modifications) disclosed in the present specification.

A controller circuit according to one embodiment controls a series capacitor step-down converter. The series capacitor step-down converter includes an input line and an output line, a first switch having a first terminal connected to the input line, a coupled inductor including a first inductor and a second inductor each having a first terminal connected to the output line, a second switch connected between a second terminal of the first inductor and a ground, a series capacitor connected between a second terminal of the first switch and the second terminal of the first inductor, a third switch connected between the second terminal of the first switch and a second terminal of the second inductor, a fourth switch connected between the second terminal of the second inductor and the ground, and an output capacitor connected to the output line. The controller circuit alternately switches between a first state in which the first switch and the fourth switch are on and a second state in which the second switch and the third switch are on while interposing a dead time between the first state and the second state, and turns on the second switch before a direction of a current of the first inductor is reversed in the dead time during a transition from the first state to the second state.

In the dead time, when the direction of the current of the first inductor is reversed from a direction of flowing into the output capacitor to an opposite direction therefrom, the drain voltage of the second switch rises, and the voltage of a connection node between the third switch and the first switch rises to the vicinity of an input voltage. As a result, a current flowing through the second inductor charges the capacitance of the fourth switch, and raises the drain-tosource voltage of the fourth switch to the vicinity of the input voltage. In the above-described configuration, the second switch is turned on before the direction of the current of the first inductor is reversed. It is thereby possible to suppress a rise in the drain voltage of the second switch, and suppress a rise in the drain voltage of the fourth switch.

In one embodiment, the controller circuit may turn on the second switch when a voltage of a connection node between the series capacitor and the second switch falls below a predetermined threshold voltage in the dead time. Thus, the second switch can be turned on before the direction of the current of the first inductor is reversed.

In one embodiment, the controller circuit may turn on the second switch when a voltage of a connection node between the third switch and the fourth switch exceeds a predetermined threshold voltage in the dead time. Thus, the second switch can be turned on before the direction of the current of the first inductor is reversed.

In one embodiment, the controller circuit may turn on the second switch when a current flowing through the first inductor in a direction of flowing to the output capacitor falls below a predetermined threshold value in the dead time. Thus, the second switch can be turned on before the direction of the current of the first inductor is reversed.

In one embodiment, the controller circuit may turn on the second switch when a current flowing through the second inductor in a direction of flowing in from the output capacitor exceeds a predetermined threshold value in the dead time. Thus, the second switch can be turned on before the direction of the current of the first inductor is reversed.

In one embodiment, the fourth switch may have a same withstand voltage as the first switch and the second switch. In general, a low withstand voltage element has a lower on resistance than a high withstand voltage element. Accordingly, efficiency can be improved by using an element having a low withstand voltage as the fourth switch.

In one embodiment, the controller circuit may be integrally integrated on one semiconductor substrate. "Integrally integrated" includes a case where all of circuit constituent elements are formed on the semiconductor substrate and a case where main circuit constituent elements are integrally integrated. A part of resistances, capacitors, and the like may be provided on the outside of the semiconductor substrate for adjustment of circuit constants. Integrating the circuit on one chip can reduce a circuit area and hold characteristics of the circuit elements uniform.

In one embodiment, a series capacitor step-down converter may include a main circuit and the controller circuit that drives the first to fourth switches included in the main circuit.

Embodiment

A preferred embodiment will hereinafter be described with reference to the drawings. Identical or equivalent constituent elements, members, and processing illustrated in each drawing are identified by the same reference signs, and repeated description thereof will be omitted as appropriate. In addition, the embodiment is not restrictive of the disclosure but is illustrative, and all features described in the embodiment and combinations thereof are not necessarily substantial to the disclosure.

In the present specification, a "state in which a member A is connected to a member B" includes not only a case where the member A and the member B are physically directly connected to each other but also a case where the member A and the member B are indirectly connected to each other via another member that does not substantially affect a state of electric connection between the member A and the member B or does not impair functions or effects produced by the coupling of the member A and the member B.

Similarly, a "state in which a member C is connected (provided) between the member A and the member B" includes not only a case where the member A and the member C or the member B and the member C are directly connected to each other but also a case where the member A and the member C or the member B and the member C are indirectly connected to each other via another member that does not substantially affect a state of electric connection between the member A and the member C or the member B and the member C or does not impair functions or effects produced by the coupling of the member A and the member C or the member B and the member C.

In addition, in the present specification, reference signs given to electric signals such as voltage signals, or current signals, or circuit elements such as resistances, capacitors, or inductors represent respective voltage values, current values, or circuit constants (resistance values, capacitance values, or inductances) as required.

Axes of ordinates and axes of abscissas in waveform charts and timing diagrams referred to in the present specification are enlarged or reduced as appropriate in order to facilitate understanding, and each waveform illustrated therein is simplified or exaggerated or emphasized in order to facilitate understanding.

FIG. 1 is a circuit diagram of a series capacitor step-down converter 100 according to the embodiment. The series capacitor step-down converter 100 steps down an input voltage Vin supplied to an input line 102, and generates an output voltage Vout after the step-down at an output line 104.

The series capacitor step-down converter 100 includes a main circuit 110 and a controller integrated circuit (IC) 200. The controller IC 200 is an application specific integrated circuit (ASIC) integrated on one semiconductor substrate.

The main circuit 110 includes first to fourth switches S1 to S4, a coupled inductor 112, a series capacitor Cr, and an output capacitor Cout.

The first switch S1 has a first terminal connected to the input line 102. The coupled inductor 112 is a transformer. The coupled inductor 112 includes a first inductor L1 and a second inductor L2 that are magnetically coupled to each other. The first inductor L1 and the second inductor L2 have a same inductance L, and have a mutual inductance M. A first terminal of each of the first inductor L1 and the second inductor L2 is connected to the output line 104.

The second switch S2 is connected between a second terminal of the first inductor L1 and a ground. The series capacitor Cr is connected between a second terminal of the first switch S1 and the second terminal of the first inductor L1. The third switch S3 is connected between the second terminal of the first switch S1 and a second terminal of the second inductor L2. The fourth switch S4 is connected between the second terminal of the second inductor L2 and the ground. The output capacitor Cout is connected between the output line 104 and the ground.

In the present example, the first to fourth switches S1 to S4 are all illustrated as N-channel metal-oxide-semiconductor field-effect transistors (MOSFETs). However, there is no limitation to this. Other transistors may be used as the first to fourth switches S1 to S4. In addition, the second switch S2 and the fourth switch S4 on a lower side may be rectifying elements such as diodes.

The controller IC 200 controls the first to fourth switches S1 to S4 to generate an output voltage Vout at the output line 104. Specifically, the controller IC 200 alternately repeats a first state φ1 and a second state φ2 at a predetermined switching frequency $f_{SW}$ while interposing a dead time $T_D$ between the first state φ1 and the second state φ2.

First State φ1:
First Switch S1=ON
Second Switch S2=OFF
Third Switch S3=OFF
Fourth Switch S4=ON
Second State φ2:
First Switch S1=OFF
Second Switch S2=ON
Third Switch S3=ON
Fourth Switch S4=OFF
Dead Time $T_D$:
First Switch S1=OFF
Second Switch S2=OFF
Third Switch S3=OFF
Fourth Switch S4=OFF As required, a dead time in a process of a transition from the first state φ1 to the second state φ2 will be distinguished by being provided with a suffix $T_{D1}$, and a dead time in a process of a transition from the second state φ2 to the first state φ1 will be distinguished by being provided with a suffix $T_{D2}$.

When the length of each of the first state φ1 and the second state φ2 is $T_{ON}$, the switching frequency $f_{SW}$ is $1/(2 \times T_{ON})$. In other words, operation at the switching frequency $f_{SW}$ refers to repeating the first state φ1 and the second state φ2 having a length of $T_{ON}=1/(2 \times f_{SW})$.

The above is a configuration of the series capacitor step-down converter 100. Operation thereof will next be described.

Figure 2:
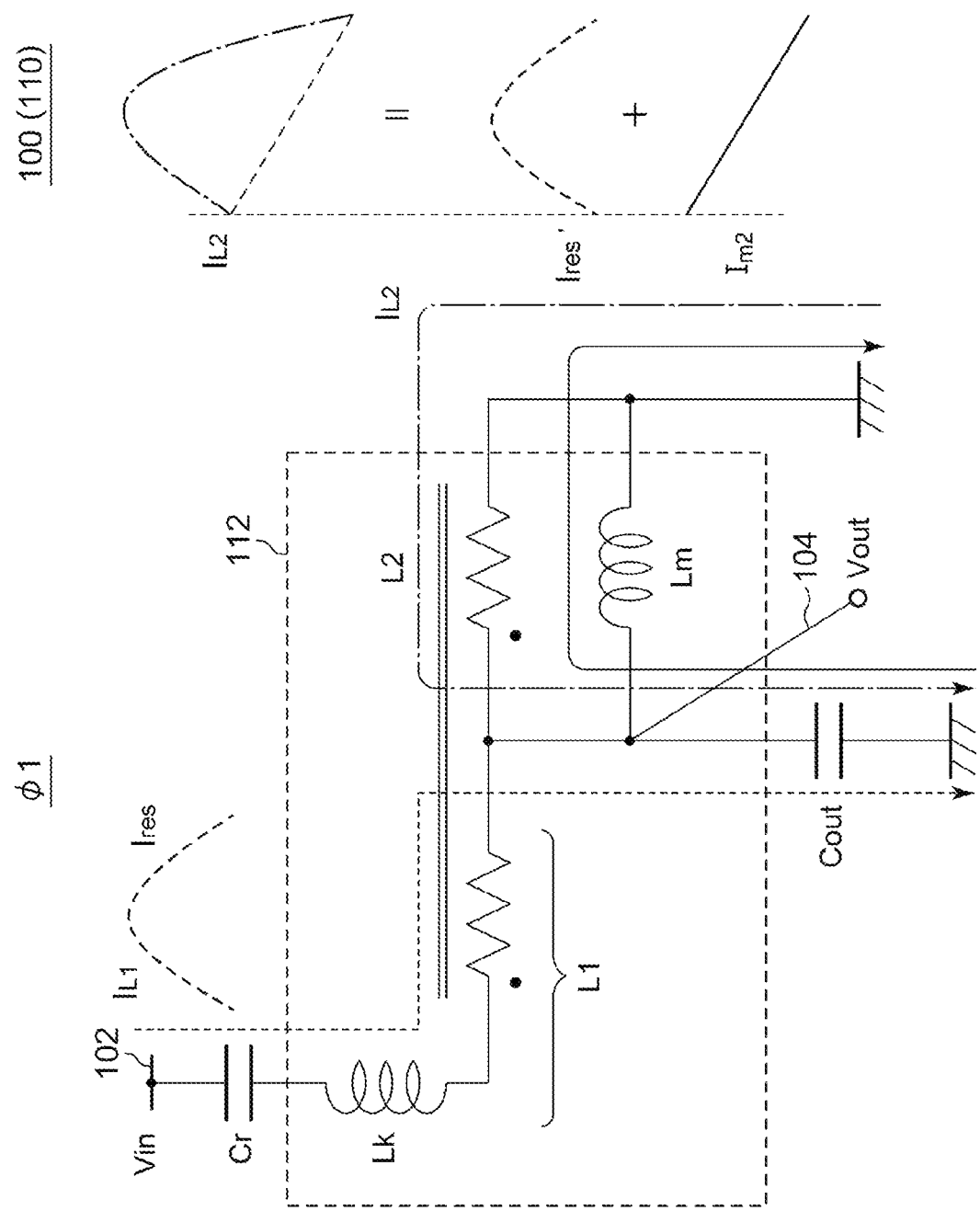
FIG. 2 is an equivalent circuit diagram of the series capacitor step-down converter (main circuit) in a first state φ1.

FIG. 2 is an equivalent circuit diagram of the series capacitor step-down converter 100 (main circuit 110) in the first state φ1. The switches S1 and S4 in an on state are represented as mere wiring. In addition, the coupled inductor 112 is represented as an equivalent circuit including an exciting inductance Lm and a leakage inductance Lk. A current flowing through the first inductor L1 will be referred to as a first coil current $I_{L1}$. A current flowing through the second inductor L2 will be referred to as a second coil current $I_{L2}$.

In the first state φ1, the series capacitor Cr, the first inductor L1 (leakage inductance Lk), and the output capacitor Cout form a series resonant circuit, and a resonance current Ires flows through the first inductor L1 ($I_{L1}$=Ires). A total current of a resonance current Ires' as a replica of the resonance current Ires flowing through the first inductor L1 and an exciting current Im₂ flowing through the exciting inductance Lm flows through the second inductor L2. Thus, the second coil current $I_{L2}$ is $I_{L2}$=Ires'+Im₂.

Figure 3:
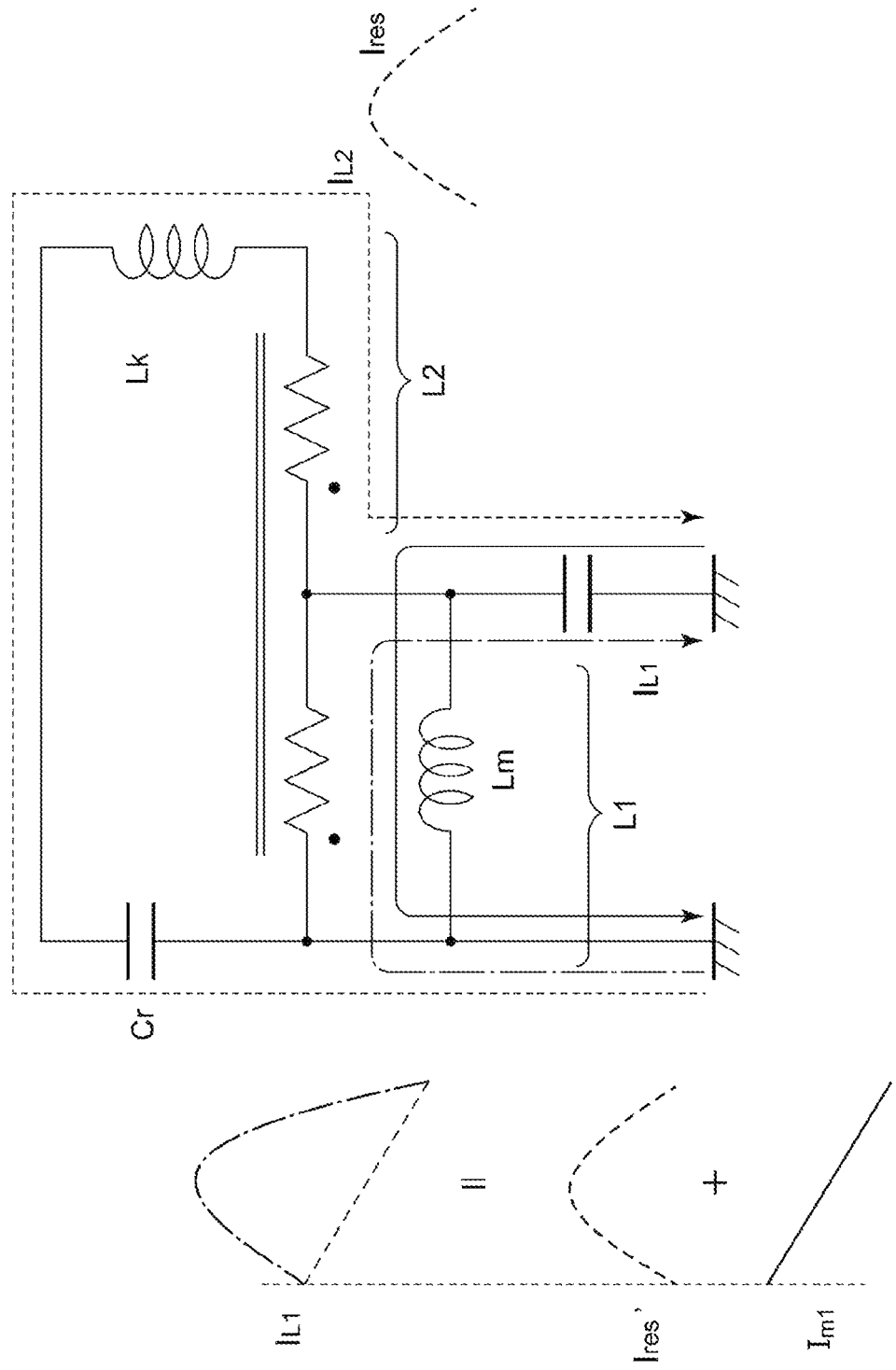
FIG. 3 is an equivalent circuit diagram of the series capacitor step-down converter (main circuit) in a second state φ2.

FIG. 3 is an equivalent circuit diagram of the series capacitor step-down converter 100 (main circuit 110) in the second state φ2. The switches S2 and S3 in an on state are represented as mere wiring.

In the second state φ2, the series capacitor Cr, the leakage inductance Lk, and the output capacitor Cout form a series resonant circuit, and a resonance current Ires flows through the second inductor L2 ($I_{L2}$=Ires). A total current of a resonance current Ires' as a replica of the resonance current Ires flowing through the second inductor L2 and an exciting current Im₁ flowing through the exciting inductance Lm flows through the first inductor L1. Thus, the first coil current $I_{L1}$ is $I_{L1}$=Ires'+Im₁.

When the first state φ1 and the second state φ2 are alternately repeated, in a steady state, a voltage across the series capacitor Cr is Vin/2, and a remaining Vin/2 is applied to the coupled inductor 112. When the inductances of the first inductor L1 and the second inductor L2 are equal to each other, the output voltage Vout that is ¼ times Vin occurs at the output line 104.

Conditions for the series capacitor step-down converter 100 to perform zero voltage switching (ZVS) are as follows.

A transition from the first state φ1 to the second state φ2

When $I_{L1} \geq 0$ during a dead time $T_D$ immediately after the first state φ1, the current $I_{L1}$ flows through a body diode of the second switch S2, and a voltage across the second switch S2 is decreased. At this time, when a transition is made to the second state φ2, that is, when the second switch S2 is turned on, ZVS of the second switch S2 is effected. Incidentally, the currents $I_{L1}$ and $I_{L2}$ have a direction of going to the output line 104 as a positive direction.

In addition, when $I_{L2}<0$ during the dead time $T_D$, a regenerative current raises the voltage of a connection node between the third switch S3 and the fourth switch S4, and decreases a voltage across the third switch S3. At this time, when a transition is made to the second state φ2, that is, when the third switch S3 is turned on, ZVS of the third switch S3 is effected.

A transition from the second state φ2 to the first state φ1

When $I_{L1}<0$ during a dead time $T_D$ immediately after the second state φ2, a regenerative current raises the voltage of a connection node between the first switch S1 and the second switch S2, and decreases a voltage across the first switch S1. At this time, when a transition is made to the first state φ1, that is, when the first switch S1 is turned on, ZVS of the first switch S1 is effected.

In addition, when $I_{L2} \geq 0$ during the dead time, the current $I_{L2}$ flows through a body diode of the fourth switch S4, and a voltage across the fourth switch S4 is decreased. At this time, when a transition is made to the first state φ1, that is, when the fourth switch S4 is turned on, ZVS of the fourth switch S4 is effected.

Figure 4:
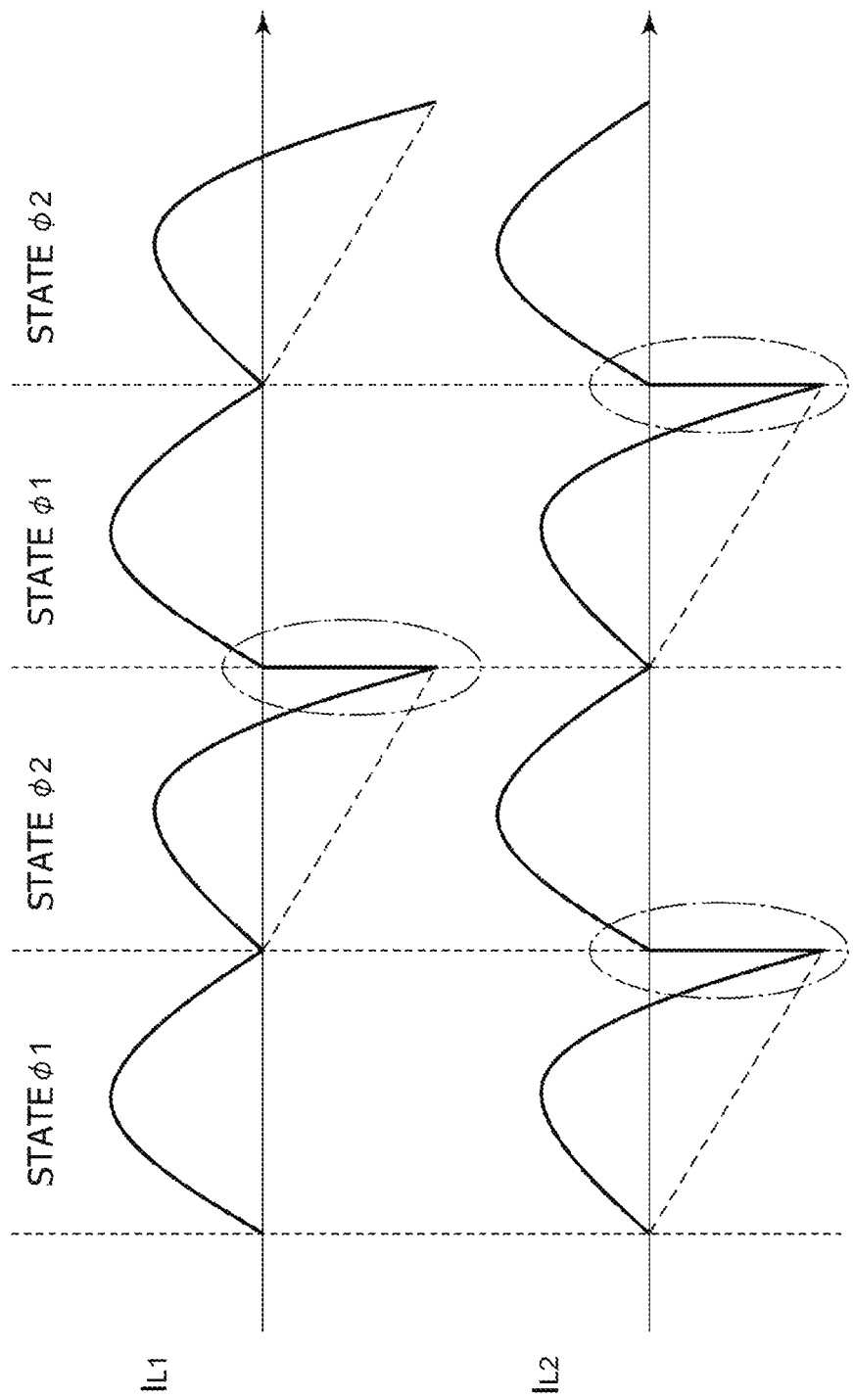
FIG. 4 is a current waveform chart of the series capacitor step-down converter.

FIG. 4 is a current waveform chart of the series capacitor step-down converter 100. The switching frequency $f_{SW}$ coincides with a resonance frequency $f_0$ of the main circuit 110, and a transition is made between the first state φ1 and the second state φ2 in timing in which the resonance current Ires becomes zero. Here, the dead time is omitted. FIG. 4 illustrates current waveforms in a case where the first to fourth switches S1 to S4 are assumed to be ideal switches, that is, in a case where the first to fourth switches S1 to S4 do not include a parasitic capacitance.

In timing of an end of the first state φ1, the current $I_{L1}$ of the first inductor L1 is positive or zero ($I_{L1} \geq 0$), and the current $I_{L2}$ of the second inductor L2 is negative ($I_{L2}<0$). The above-described ZVS conditions are therefore satisfied.

Similarly, in timing of an end of the second state φ2, the current $I_{L1}$ of the first inductor L1 is negative ($I_{L1}<0$), and the current $I_{L2}$ of the second inductor L2 is positive or zero ($I_{L2} \geq 0$). The above-described ZVS conditions are therefore satisfied.

Thus, the series capacitor step-down converter 100 can satisfy the ZVS conditions by switching at the resonance frequency $f_0$. The series capacitor step-down converter 100 can therefore perform high-efficiency operation.

Figure 5:
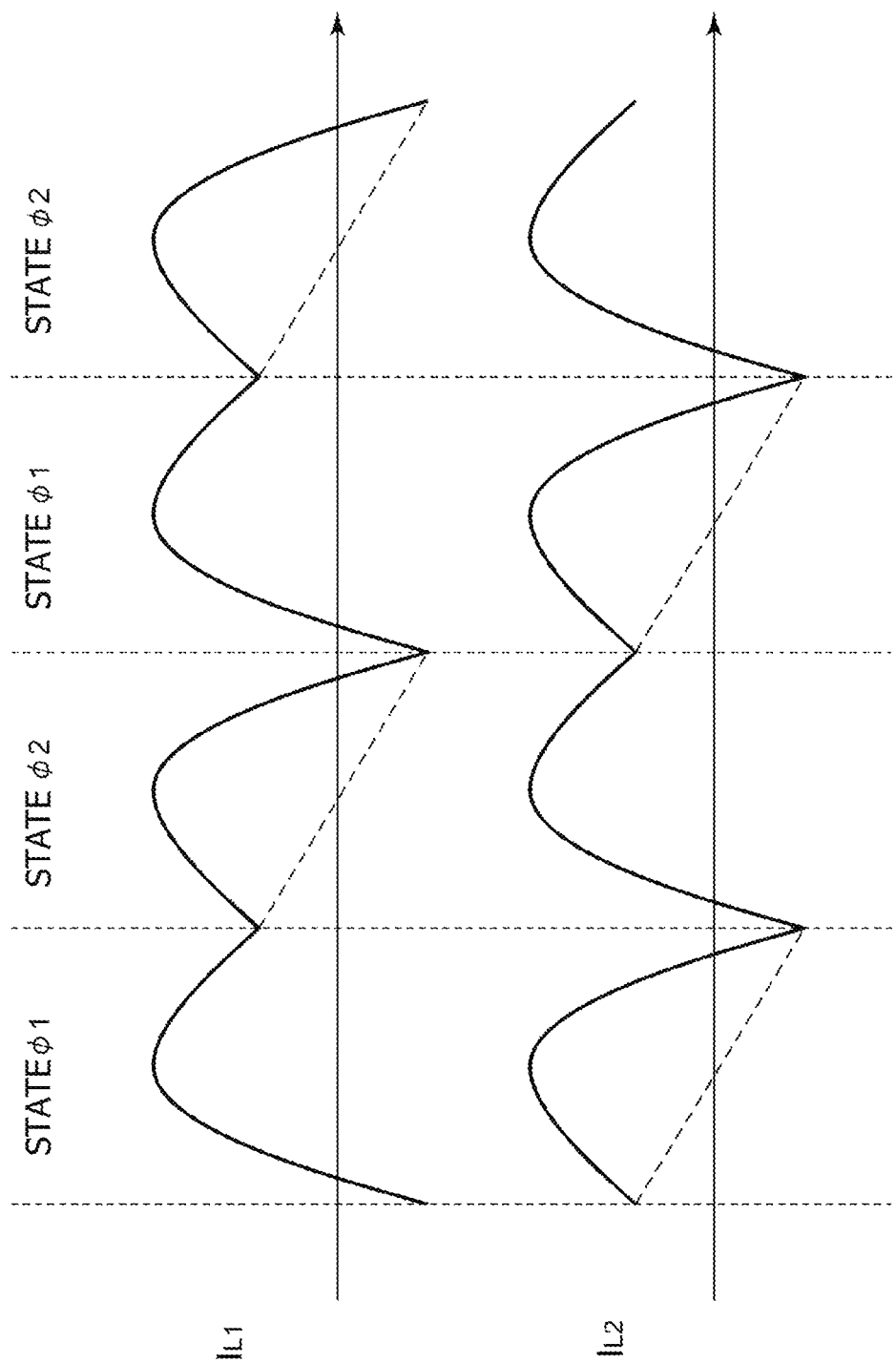
FIG. 5 is a current waveform chart of the series capacitor step-down converter.

FIG. 5 is a current waveform chart of the series capacitor step-down converter 100. FIG. 4 illustrates waveforms with the parasitic capacitances of the MOSFETs ignored. In actuality, however, the parasitic capacitances are present. The parasitic capacitances suppress current discontinuity straddling a dead time. The coil currents $I_{L1}$ and $I_{L2}$ become continuous, and the coil currents $I_{L1}$ and $I_{L2}$ in the first state φ1 and the second state φ2 have symmetric waveforms on a time axis with respect to the dead time.

Figure 6:
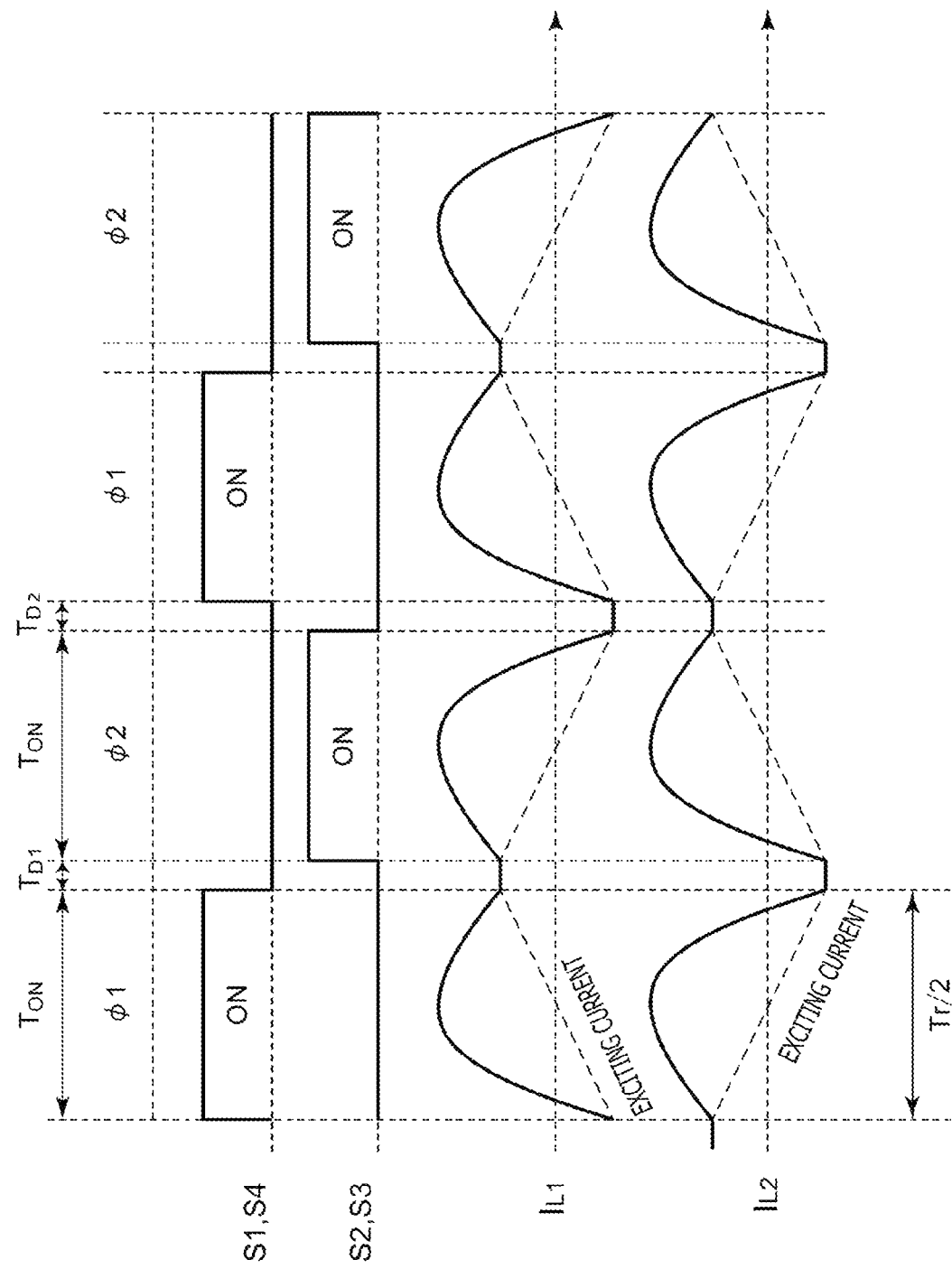
FIG. 6 is a timing diagram of assistance in explaining operation of the series capacitor step-down converter with dead times taken into consideration.

FIG. 6 is a timing diagram of assistance in explaining operation of the series capacitor step-down converter 100 with dead times taken into consideration. FIG. 6 illustrates operation in a case where the switching frequency $f_{SW}$ is equal to the resonance frequency $f_0$, and each of the lengths $T_{ON}$ of the first state φ1 and the second state φ2 is ½ of a resonance period $T_r$ (=1/$f_r$).

Consideration will be given to an operation mode in which the switching frequency $f_{SW}$ is higher than the resonance frequency $f_0$ of the main circuit 110 ($f_{SW}$>$f_0$).

Figure 7:
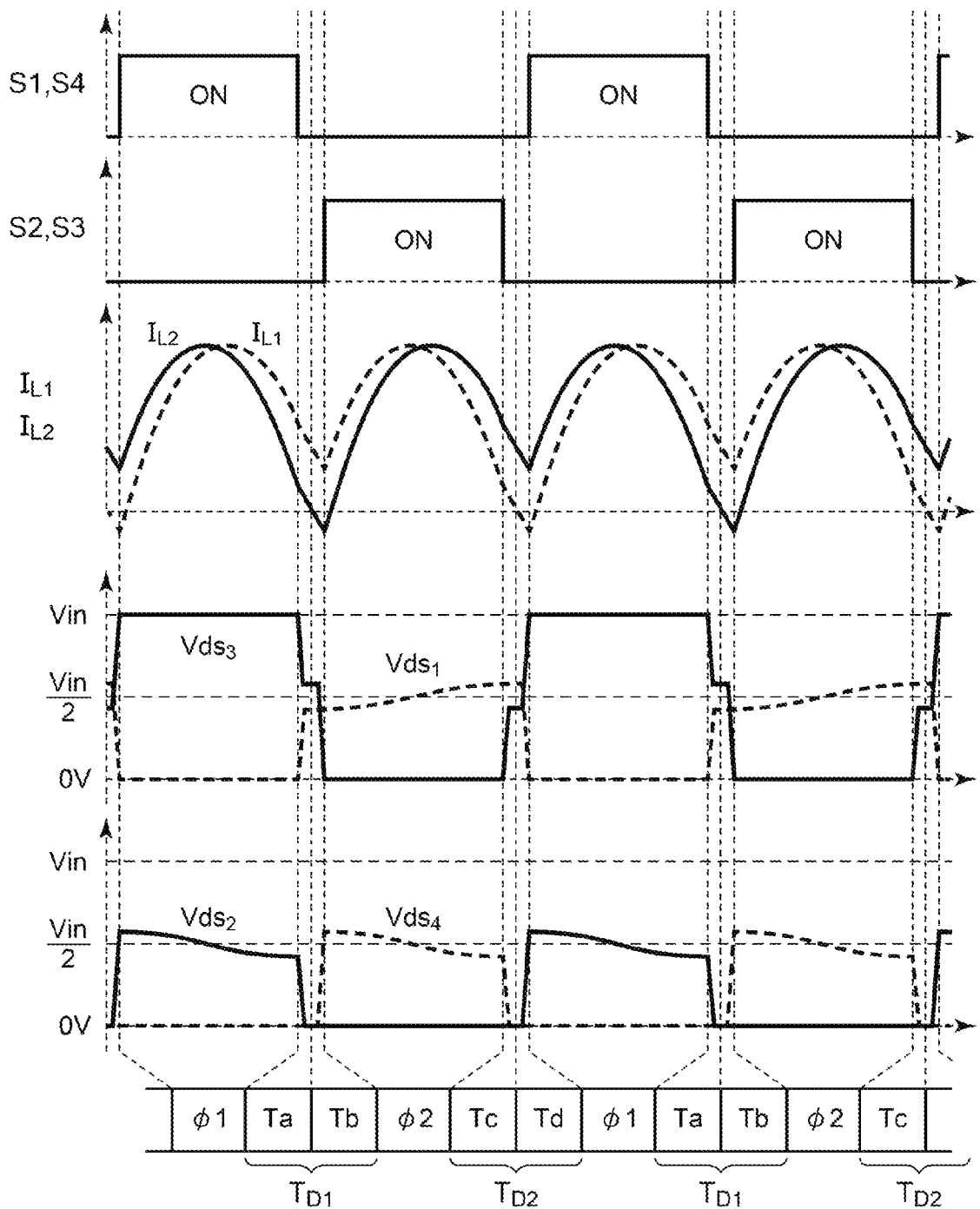
FIG. 7 is a timing diagram of assistance in explaining operation of the series capacitor step-down converter.
Figure 8:
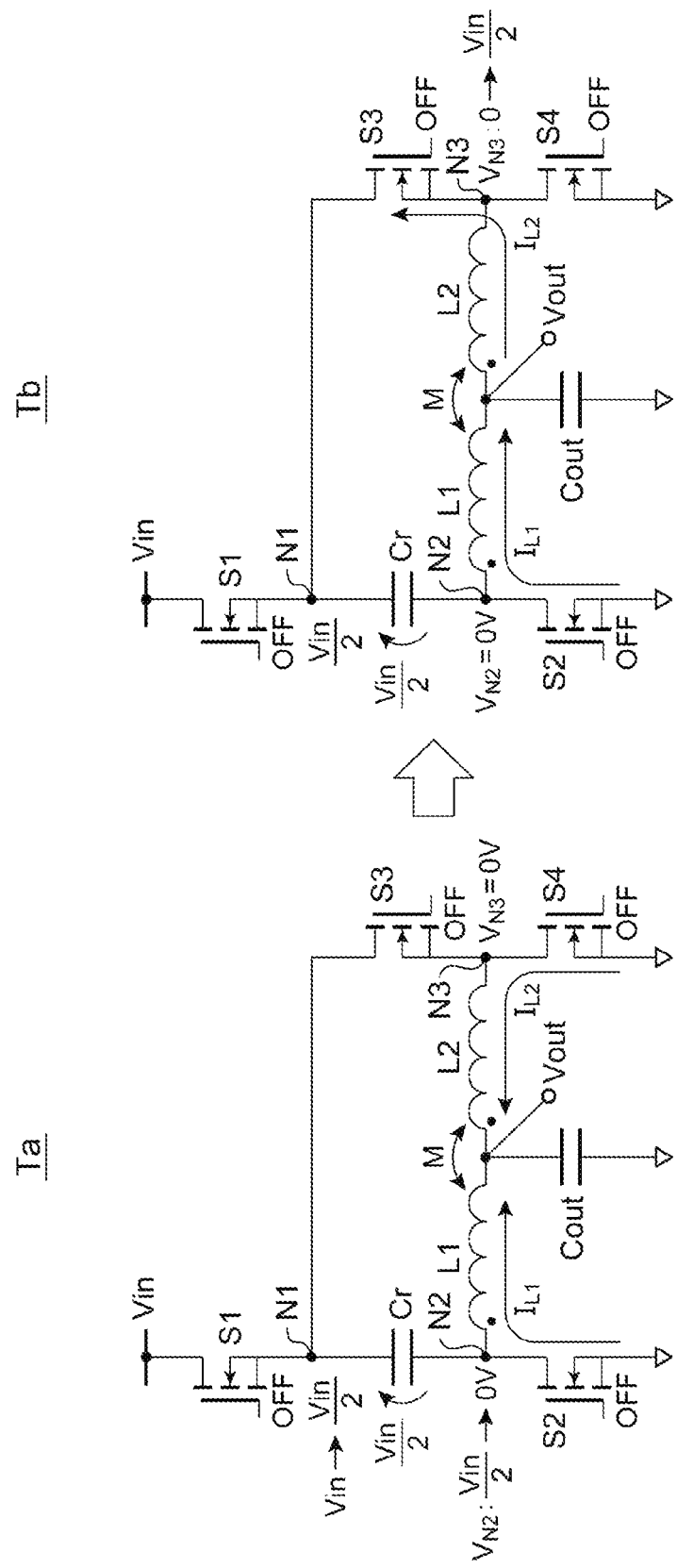
FIG. 8 is a circuit diagram illustrating the voltages and currents of respective nodes in a dead time $T_{D1}$.

FIG. 7 is a timing diagram of assistance in explaining operation of the series capacitor step-down converter 100. FIG. 8 is a circuit diagram illustrating the voltages and currents of respective nodes in a dead time $T_{D1}$. A connection node between the first switch S1 and the series capacitor Cr will be referred to as a first node N1. A connection node between the series capacitor Cr and the second switch S2 will be referred to as a second node N2. A connection node between the third switch S3 and the fourth switch S4 will be referred to as a third node N3. A voltage $V_{N2}$ of the second node N2 is a drain-to-source voltage $Vds_2$ of the second switch S2. A voltage $V_{N3}$ of the third node N3 is a drain-to-source voltage $Vds_4$ of the fourth switch S4.

A reference will be made to FIG. 7. The dead time $T_{D1}$ includes two intervals Ta and Tb. FIG. 7 illustrates, in order from a top, a state of the first switch S1 and the fourth switch S4, a state of the second switch S2 and the third switch S3, the currents $I_{L1}$ and $I_{L2}$ flowing through the first inductor L1 and the second inductor L2, the respective drain-to-source voltages Vds of the first switch S1 and the third switch S3, and the respective drain-to-source voltages Vds of the second switch S2 and the fourth switch S4. The currents $I_{L1}$ and $I_{L2}$ have a direction of flowing into the output capacitor Cout as a positive direction.

In the first state φ1, the first switch S1 is on. Therefore, the drain-to-source voltage $Vds_1$ of the first switch S1 is 0 V, and a voltage $V_{N1}$ of the first node N1 is equal to the input voltage Vin. In addition, the fourth switch S4 is on. Therefore, the drain-to-source voltage $Vds_4$ of the fourth switch S4 is 0 V, and the voltage $V_{N3}$ of the third node N3 is 0 V.

In the steady state, a voltage Vc of the series capacitor Cr is Vin/2. The voltage $V_{N2}$ of the second node N2 is lower than the voltage $V_{N1}$(=Vin) of the first node N1 by Vc (=Vin/2), and is therefore Vin/2. Hence, the drain-to-source voltage $Vds_2$ of the second switch S2 is Vin/2.

When the dead time $T_{D1}$ arrives, the first to fourth switches S1 to S4 are turned off. In a first half Ta of the dead time $T_{D1}$, $I_{L1}$>0 and $I_{L2}$>0. When the second switch S2 is turned off, the current $I_{L1}$ flows through the body diode of the second switch S2, the parasitic capacitance of the second node N2 (drain-to-source capacitance of the second switch S2) is discharged, and the voltage $V_{N2}$ (that is, $Vds_2$) of the second node N2 decreases from Vin/2 to 0 V.

The voltage $V_{N1}$ of the first node N1 is higher than the voltage $V_{N2}$ of the second node N2 by the voltage Vc (=Vin/2) of the series capacitor Cr. Hence, in the interval Ta, the voltage $V_{N1}$ of the first node N1 changes from Vin to Vin/2. At this time, the drain-to-source voltage $Vds_1$ of the first switch S1 increases from 0 V to Vin/2.

The current $I_{L2}$ of the second inductor L2 flows through the body diode of the fourth switch S4. The drain-to-source voltage $Vds_4$ of the fourth switch S4 is therefore maintained at 0 V or in the vicinity thereof. The drain-to-source voltage $Vds_3$ of the third switch S3 is a potential difference between the first node N1 and the third node N3, and therefore changes from Vin to Vin/2.

When a second half Tb of the dead time $T_{D1}$ arrives, the current $I_{L2}$ of the second inductor L2 is inverted ($I_{L2}$<0). Then, the current $I_{L2}$ flows through a body diode of the third switch S3, and charges the parasitic capacitance of the third node N3 (drain-to-source capacitance of the fourth switch S4). As a result, the voltage $V_{N3}$ of the third node N3 rises from 0 V to Vin/2, and the drain-to-source voltage $Vds_3$ of the third switch S3 decreases to 0 V.

In the interval Tb, the drain-to-source voltage $Vds_4$ of the fourth switch S4 increases from 0 V to Vin/2.

Directing attention to FIG. 7, the drain-to-source voltages $Vds_1$, $Vds_2$, and $Vds_4$ of the first switch S1, the second switch S2, and the fourth switch S4 each change between 0 and Vin/2. Hence, when the operation waveforms of FIG. 7 are maintained, it suffices for the first switch S1, the second switch S2, and the fourth switch S4 to be constituted by elements having a withstand voltage of Vin/2, and it suffices for only the third switch S3 to be constituted by an element having a withstand voltage of Vin.

The present inventors have investigated operation in dead time periods and have come to recognize the following problem. It is to be noted that this problem is not to be recognized as an ordinary one for those skilled in the art.

Figure 9:
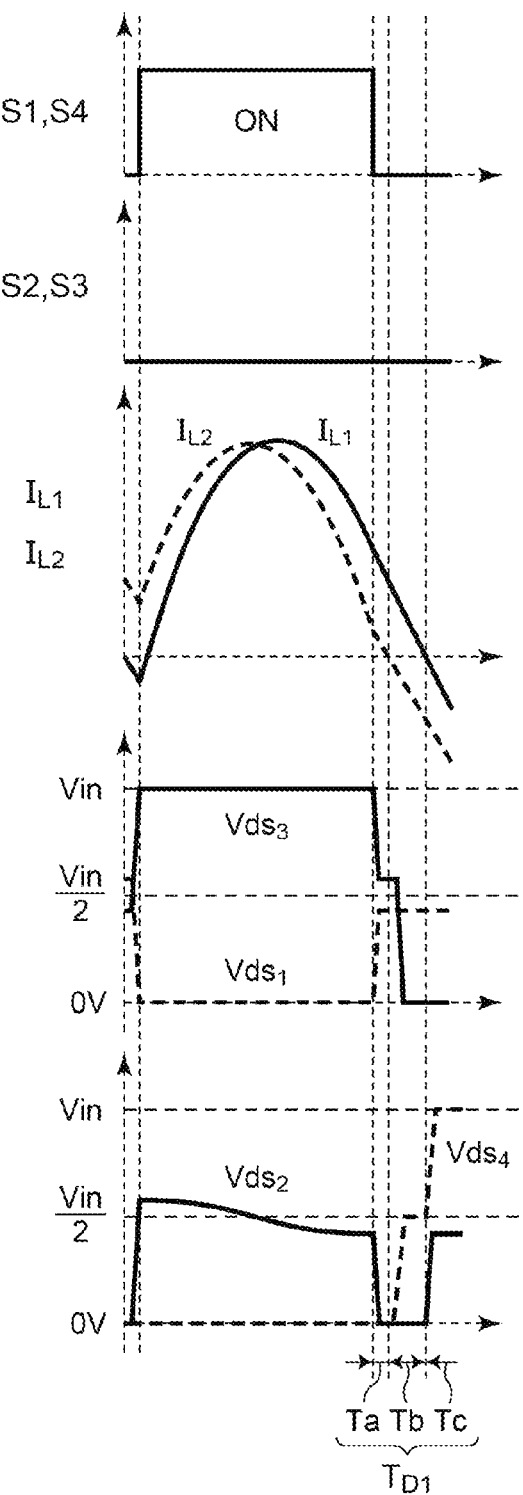
FIG. 9 is a timing diagram of assistance in explaining a problem that can occur in the series capacitor step-down converter.
Figure 10:
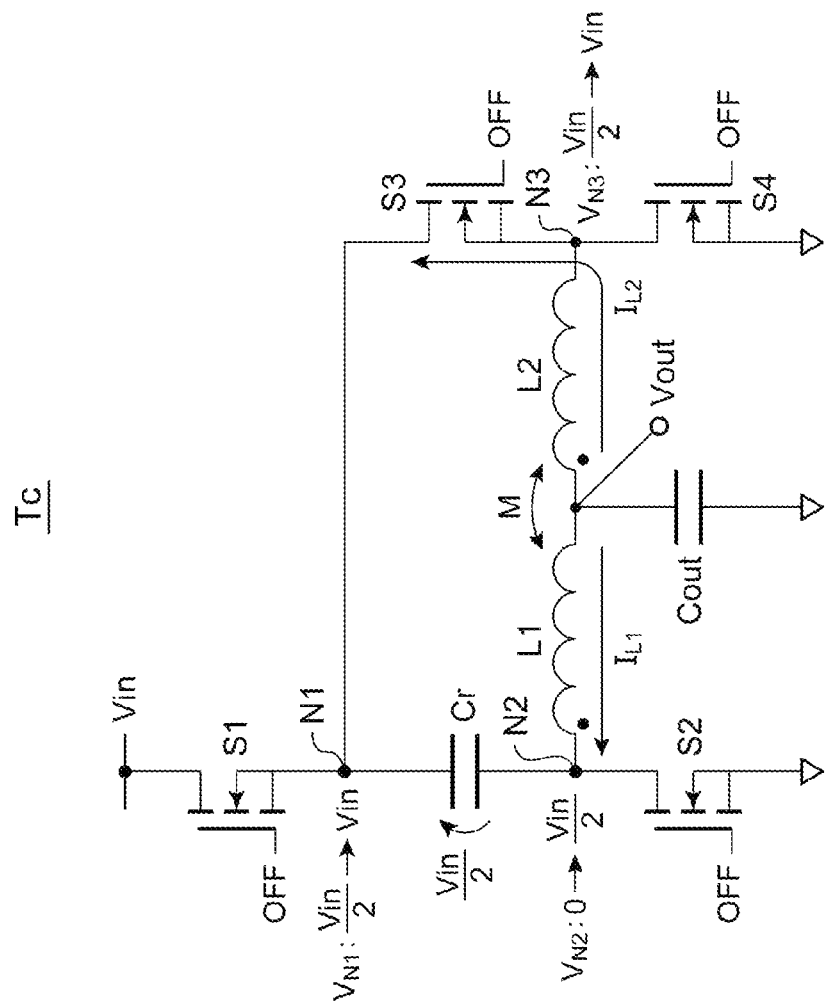
FIG. 10 is a circuit diagram illustrating the voltages and currents of the respective nodes in an interval Tc.

FIG. 9 is a timing diagram of assistance in explaining a problem that can occur in the series capacitor step-down converter 100. In this timing diagram, the dead time $T_{D1}$ includes three intervals Ta, Tb, and Tc. FIG. 10 is a circuit diagram illustrating the voltages and currents of the respective nodes in the interval Tc.

When the dead time $T_{D1}$ is lengthened, the direction of the current $I_{L1}$ flowing through the first inductor L1 is reversed ($I_{L1}$<0), and the interval Tc is started. In the interval Tc, the current $I_{L1}$ flowing through the first inductor L1 in an opposite direction raises the voltage $V_{N2}$ of the second node N2 from 0 V to Vin/2. Then, the voltage $V_{N1}$ of the first node N1 is charged by the current $I_{L2}$ passing through the body diode of the third switch S3, and increases from Vin/2 to Vin. When the current $I_{L2}$ flows through the body diode of the third switch S3, the voltage $V_{N1}$ of the first node N1 and the voltage $V_{N3}$ of the third node N3 are substantially equal to each other. The voltage $V_{N3}$ of the third node N3 therefore rises from Vin/2 to Vin.

Thus, when the direction of the current $I_{L1}$ of the first inductor L1 is reversed during the dead time $T_{D1}$, the voltage Vin is applied to the fourth switch S4 in the interval Tc. Hence, in addition to the third switch S3, the fourth switch S4 needs to be constituted by a high withstand voltage element.

In general, a low withstand voltage element has a lower on resistance and a better frequency characteristic than a high withstand voltage element. Therefore, when a design is made so as to tolerate the operation mode during the interval Tc, the on resistance of the fourth switch S4 is increased, and consequently conversion efficiency is decreased.

The above is a problem that can occur in the series capacitor step-down converter 100. In order to solve this problem, the controller IC 200 performs the following control.

Figure 11:
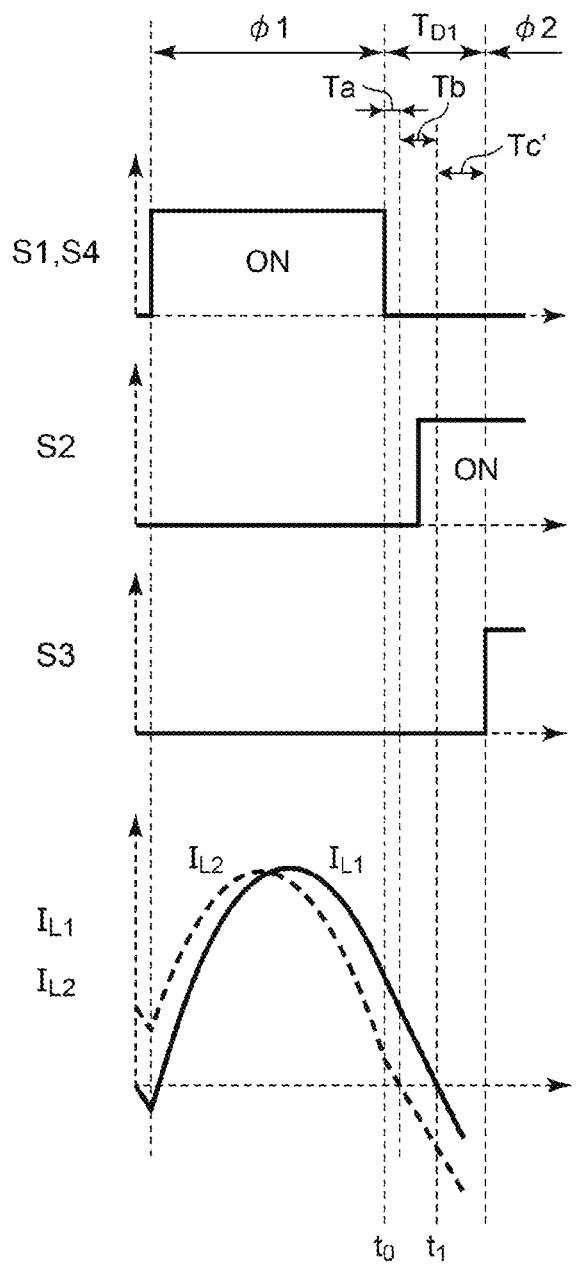
FIG. 11 is a timing diagram of assistance in explaining control of the series capacitor step-down converter by a controller IC according to the embodiment.

FIG. 11 is a timing diagram of assistance in explaining the control of the series capacitor step-down converter 100 by the controller IC 200 according to the embodiment.

In the dead time $T_{D1}$ during a transition from the first state φ1 to the second state φ2, the controller IC 200 turns on the second switch S2 ahead of the third switch S3 before time ti at which the direction of the current $I_{L1}$ of the first inductor L1 is reversed.

Figure 12:
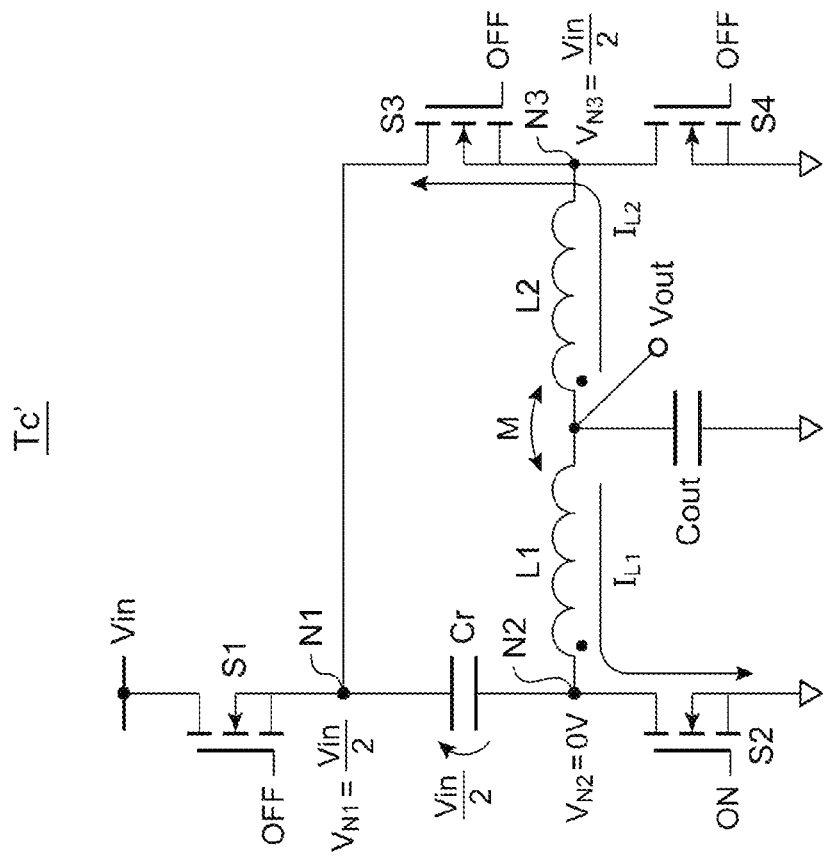
FIG. 12 is a diagram illustrating the voltages and currents of the respective nodes in an interval Tc' in which a second switch is on, $I_{L1}<0$, and $I_{L2}<0$.

FIG. 12 is a diagram illustrating the voltages and currents of the respective nodes in an interval Tc' in which the second switch S2 is on, $I_{L1}$<0, and $I_{L2}$<0. Because the second switch S2 is on, the voltage $V_{N2}$ of the second node N2 is 0 V. The current $I_{L1}$ flowing in the reverse direction flows through the second switch S2 to the ground. Because the voltage $V_{N2}$ of the second node N2 is fixed at 0 V, the voltage of the first node N1 is fixed at Vin/2. The current $I_{L2}$ flows into the first node N1 via the body diode of the third switch S3, and charges the series capacitor Cr.

The above is an operation of the series capacitor step-down converter 100. According to this control, after the discharging of the second node N2 has progressed to a certain degree, and the voltage $V_{N2}$ of the second node N2 has become sufficiently low, the second switch S2 is turned on before the direction of the current $I_{L1}$ is reversed. Consequently, the voltage $V_{N3}$ of the third node N3 changes in a range of 0 V to Vin/2, and can be prevented from rising to the input voltage Vin. This can prevent the application of a high voltage to the fourth switch S4.

As with the first switch S1 and the second switch S2, the fourth switch S4 can be constituted by an element having a withstand voltage of Vin/2. In that case, as compared with a case where the fourth switch S4 is constituted by an element having a withstand voltage of Vin, the on resistance of the fourth switch S4 can be reduced, so that the efficiency of the series capacitor step-down converter 100 can be improved.

Returning to FIG. 11, description will be made of timing of turning on the second switch S2. After a transition is made to the dead time $T_{D1}$ at time to, it suffices to turn on the second switch S2 after timing in which the voltage $V_{N2}$ of the second node N2, that is, the drain-to-source voltage of the second switch S2 is sufficiently decreased and before time ti at which the direction of the current $I_{L1}$ is reversed.

Figure 13:
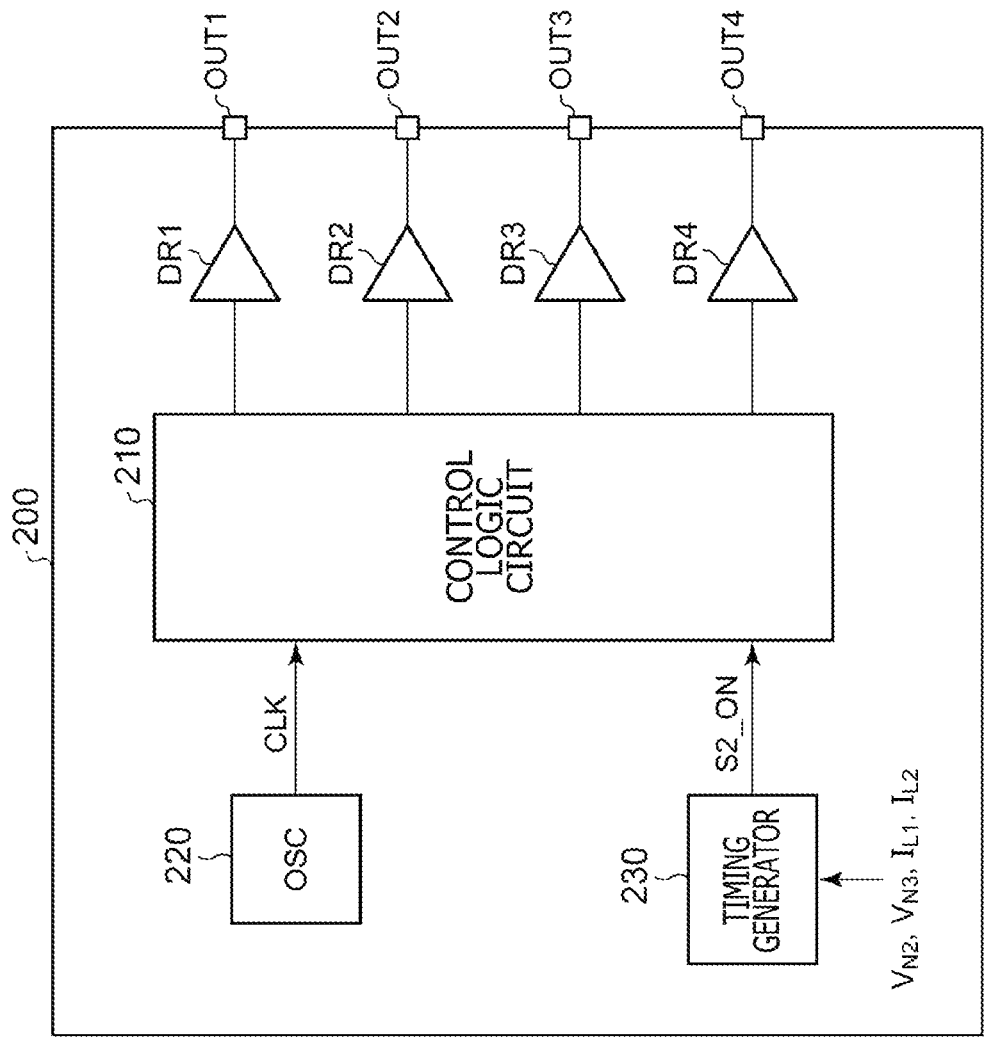
FIG. 13 is a circuit diagram illustrating an example of a configuration of the controller IC according to the embodiment.

FIG. 13 is a circuit diagram illustrating an example of a configuration of the controller IC 200 according to the embodiment. The controller IC 200 includes drivers DR1 to DR4, a control logic circuit 210, an oscillator 220, and a timing generator 230.

The oscillator 220 generates a clock signal CLK that defines the switching frequency. The control logic circuit 210 alternately repeats the first state φ1 and the second state φ2 in synchronism with the clock signal CLK while interposing a dead time between the first state φ1 and the second state φ2. The drivers DR1 to DR4 drive the corresponding switches S1 to S4 according to control signals generated by the control logic circuit 210.

The timing generator 230 generates a timing signal S2_ON that gives an instruction for the timing of turning on the second switch S2. The control logic circuit 210 turns on the second switch S2 when the timing signal S2_ON is asserted (for example, rendered high) in the dead time $T_{D1}$.

Several examples of operation of the timing generator 230 will be described.

Figure 14:
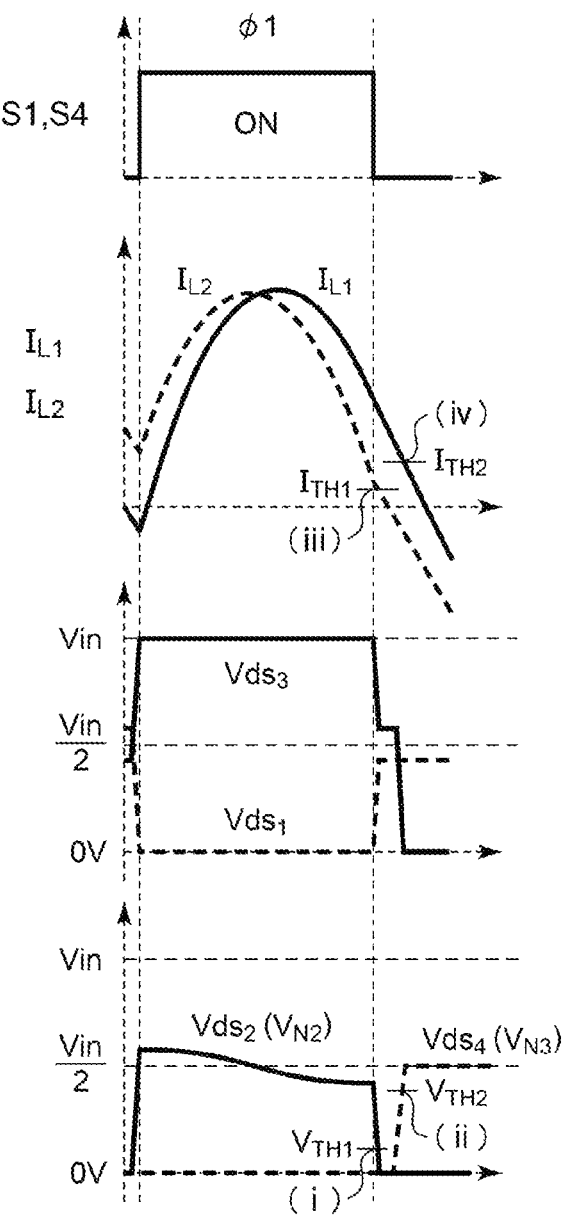
FIG. 14 is a waveform chart of assistance in explaining operation of a timing generator.

FIG. 14 is a waveform chart of assistance in explaining operation of the timing generator 230. FIG. 14 illustrates four operation examples as (i) to (iv).

(i) The timing generator 230 may, for example, monitor the voltage $V_{N2}$ of the second node N2 (that is, the drain-to-source voltage $Vds_2$ of the second switch S2) and assert the timing signal S2_ON when the voltage $V_{N2}$ of the second node N2 becomes lower than (crosses) a threshold level $V_{TH1}$ set in the vicinity 0 V, for example, between several tens mV and 200 mV. In this case, the timing generator 230 can be constituted by a voltage comparator.

(ii) The timing generator 230 may, for example, monitor the voltage $V_{N3}$ of the third node N3 (that is, the drain-to-source voltage $Vds_4$ of the fourth switch S4) and assert the timing signal S2_ON when the voltage $V_{N3}$ of the third node N3 exceeds (crosses) a threshold voltage $V_{TH2}$ set higher than 0 V and lower than Vin/2. In this case, the timing generator 230 can be constituted by a voltage comparator.

(iii) The timing generator 230 may, for example, directly monitor the current $I_{L1}$ of the first inductor L1 and assert the timing signal S2_ON when the current $I_{L1}$ becomes smaller than a positive threshold current $I_{TH1}$ in the vicinity of 0 A. In this case, the timing generator 230 may include a current detecting circuit that converts the current $I_{L1}$ into a voltage signal and a voltage comparator that compares the voltage signal with a threshold voltage. A configuration of the current detecting circuit is not particularly limited. However, for example, a sense resistance may be inserted in series with the inductor L1, and a voltage drop across the sense resistance may be detected.

(iv) The timing generator 230 may, for example, monitor the current $I_{L2}$ of the second inductor L2 and assert the timing signal S2_ON when the current $I_{L2}$ becomes smaller than a positive threshold current $I_{TH2}$. In this case, the timing generator 230 may include a current detecting circuit that converts the current $I_{L2}$ into a voltage signal and a voltage comparator that compares the voltage signal with a threshold voltage.

(Applications)

Figure 15:
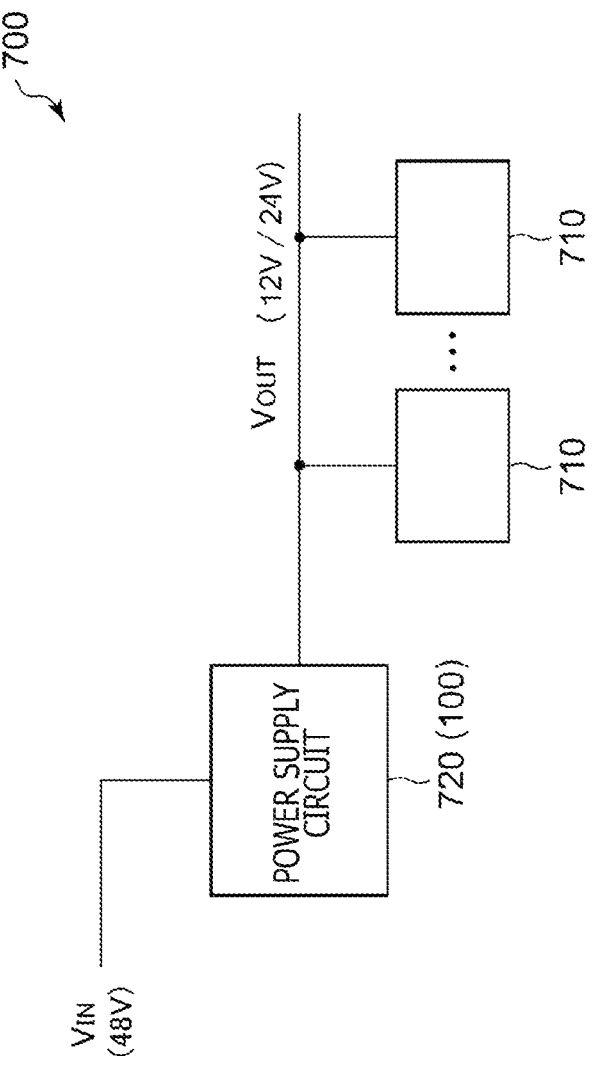
FIG. 15 is a diagram illustrating an example of an electronic apparatus including the series capacitor step-down converter.

FIG. 15 is a diagram illustrating an example of an electronic apparatus 700 including the series capacitor step-down converter 100. A suitable example of the electronic apparatus 700 is a server. Originally, a power supply line of 12 V has been led into the server. Internal circuits 710 are therefore designed to operate at 12 V. The internal circuits 710 can include a central processing unit (CPU), a memory, a local area network (LAN) interface circuit, a DC/DC converter that steps down the voltage of 12 V, and the like.

Recently, a move has been under way to change a bus voltage from 12 to 48 V in order to reduce a current flowing through a wire. In this case, a power supply circuit 720 that steps down a power supply voltage of 48 to 12 V is necessary. The series capacitor step-down converter 100 having a gain of ¼ times as described above can be suitably used as such a power supply circuit 720.

The electronic apparatus 700 is not limited to the server, but the electronic apparatus 700 may be a vehicle-mounted apparatus. Automobile batteries of 12 V or 24 V are mainstream automobile batteries. However, there are cases where a 48-V system is employed in a hybrid vehicle. Also in this case, a power supply circuit that converts a battery voltage of 48 V to 12 V is necessary. In such a case, the ¼ times series capacitor step-down converter 100 can be used suitably.

Besides, the electronic apparatus 700 may be an industrial apparatus or an OA apparatus, or may be a consumer appliance such as an audio apparatus.

The embodiments are illustrative, and it is to be understood by those skilled in the art that there are various modifications to combinations of respective constituent elements and respective processing processes of these embodiments, and that such modifications are also included in the present disclosure and can constitute the scope of the present disclosure.

(Supplementary Notes)
(Item 1)
A controller circuit of a series capacitor step-down converter,
the series capacitor step-down converter including
an input line and an output line,
a first switch having a first terminal connected to the input line,
a coupled inductor including a first inductor and a second inductor each having a first terminal connected to the output line,
a second switch connected between a second terminal of the first inductor and a ground,
a series capacitor connected between a second terminal of the first switch and the second terminal of the first inductor,
a third switch connected between the second terminal of the first switch and a second terminal of the second inductor,
a fourth switch connected between the second terminal of the second inductor and the ground, and
an output capacitor connected to the output line,
the controller circuit being configured to
alternately switch between a first state in which the first switch and the fourth switch are on and a second state in which the second switch and the third switch are on while interposing a dead time between the first state and the second state, and
turn on the second switch ahead of the third switch before a direction of a current of the first inductor is reversed in the dead time during a transition from the first state to the second state.

(Item 2)
The controller circuit according to item 1, in which
the controller circuit turns on the second switch when a voltage of a connection node between the series capacitor and the second switch falls below a predetermined threshold voltage in the dead time.

(Item 3)
The controller circuit according to item 1, in which
the controller circuit turns on the second switch when a voltage of a connection node between the third switch and the fourth switch exceeds a predetermined threshold voltage in the dead time.

(Item 4)
The controller circuit according to item 1, in which
the controller circuit turns on the second switch when a current flowing through the first inductor in a direction of flowing to the output capacitor falls below a predetermined threshold value in the dead time.

(Item 5)
The controller circuit according to item 1, in which
the controller circuit turns on the second switch when a current flowing through the second inductor in a direction of flowing in from the output capacitor exceeds a predetermined threshold value in the dead time.

(Item 6)
The controller circuit according to any one of Items 1 to 5, in which
the fourth switch has a same withstand voltage as the first switch and the second switch.

(Item 7)
The controller circuit according to any one of items 1 to 6, in which
the controller circuit is integrally integrated on one semiconductor substrate.

(Item 8)
A series capacitor step-down converter including:
a main circuit of the series capacitor step-down converter; and
the controller circuit according to any one of items 1 to 7, the controller circuit being configured to drive the first to fourth switches included in the main circuit.

(Item 9)
A control method of a series capacitor step-down converter,
the series capacitor step-down converter including
an input line and an output line,
a first switch having a first terminal connected to the input line,
a coupled inductor including a first inductor and a second inductor each having a first terminal connected to the output line,
a second switch connected between a second terminal of the first inductor and a ground,
a series capacitor connected between a second terminal of the first switch and the second terminal of the first inductor,
a third switch connected between the second terminal of the first switch and a second terminal of the second inductor,
a fourth switch connected between the second terminal of the second inductor and the ground, and
an output capacitor connected to the output line,
the control method including:
a first step of alternately switching between a first state in which the first switch and the fourth switch are on and a second state in which the second switch and the third switch are on while interposing a dead time between the first state and the second state; and
a second step of turning on the second switch ahead of the third switch before a direction of a current of the first inductor is reversed in the dead time during a transition from the first state to the second state.

(Item 10)
The control method according to item 9, in which
the second step includes turning on the second switch when a voltage of a connection node between the first switch and the second switch falls below a predetermined threshold voltage in the dead time.

(Item 11)
The control method according to item 9, in which
the second step turns on the second switch when a voltage of a connection node between the third switch and the fourth switch exceeds a predetermined threshold voltage in the dead time.

(Item 12)
The control method according to item 9, in which
the second step turns on the second switch when a current flowing through the first inductor in a direction of flowing to the output capacitor falls below a predetermined threshold value in the dead time.

(Item 13)
The control method according to item 9, in which
the second step turns on the second switch when a current flowing through the second inductor in a direction of flowing in from the output capacitor exceeds a predetermined threshold value in the dead time.

According to a certain aspect of the present disclosure, the voltage applied to the fourth switch can be reduced.

What is claimed is:

1. A controller circuit of a series capacitor step-down converter,
the series capacitor step-down converter including
an input line and an output line,
a first switch having a first terminal connected to the input line,
a coupled inductor including a first inductor and a second inductor each having a first terminal connected to the output line,
a second switch connected between a second terminal of the first inductor and a ground,
a series capacitor connected between a second terminal of the first switch and the second terminal of the first inductor,
a third switch connected between the second terminal of the first switch and a second terminal of the second inductor,
a fourth switch connected between the second terminal of the second inductor and the ground, and
an output capacitor connected to the output line,
the controller circuit being configured to
alternately switch between a first state in which the first switch and the fourth switch are on and a second state in which the second switch and the third switch are on while interposing a dead time between the first state and the second state, and
turn on the second switch ahead of the third switch before a direction of a current of the first inductor is reversed in the dead time during a transition from the first state to the second state.

2. The controller circuit according to claim 1, wherein the controller circuit turns on the second switch when a voltage of a connection node between the series capacitor and the second switch falls below a predetermined threshold voltage in the dead time.

3. The controller circuit according to claim 1, wherein the controller circuit turns on the second switch when a voltage of a connection node between the third switch and the fourth switch exceeds a predetermined threshold voltage in the dead time.

4. The controller circuit according to claim 1, wherein the controller circuit turns on the second switch when a current flowing through the first inductor in a direction of flowing to the output capacitor falls below a predetermined threshold value in the dead time.

5. The controller circuit according to claim 1, wherein the controller circuit turns on the second switch when a current flowing through the second inductor in a direction of flowing in from the output capacitor exceeds a predetermined threshold value in the dead time.

6. The controller circuit according to claim 1, wherein the fourth switch has a same withstand voltage as the first switch and the second switch.

7. The controller circuit according to claim 1, wherein the controller circuit is integrally integrated on one semiconductor substrate.

8. A series capacitor step-down converter comprising:
a main circuit of the series capacitor step-down converter; and
the controller circuit according to claim 1, the controller circuit being configured to drive the first to fourth switches included in the main circuit.

9. A control method of a series capacitor step-down converter,
the series capacitor step-down converter including
an input line and an output line,
a first switch having a first terminal connected to the input line,
a coupled inductor including a first inductor and a second inductor each having a first terminal connected to the output line,
a second switch connected between a second terminal of the first inductor and a ground,
a series capacitor connected between a second terminal of the first switch and the second terminal of the first inductor,
a third switch connected between the second terminal of the first switch and a second terminal of the second inductor,
a fourth switch connected between the second terminal of the second inductor and the ground, and
an output capacitor connected to the output line,
the control method comprising:
a first step of alternately switching between a first state in which the first switch and the fourth switch are on and a second state in which the second switch and the third switch are on while interposing a dead time between the first state and the second state; and
a second step of turning on the second switch ahead of the third switch before a direction of a current of the first inductor is reversed in the dead time during a transition from the first state to the second state.

10. The control method according to claim 9, wherein the second step includes turning on the second switch when a voltage of a connection node between the first switch and the second switch falls below a predetermined threshold voltage in the dead time.

11. The control method according to claim 9, wherein the second step turns on the second switch when a voltage of a connection node between the third switch and the fourth switch exceeds a predetermined threshold voltage in the dead time.

12. The control method according to claim 9, wherein the second step turns on the second switch when a current flowing through the first inductor in a direction of flowing to the output capacitor falls below a predetermined threshold value in the dead time.

13. The control method according to claim 9, wherein the second step turns on the second switch when a current flowing through the second inductor in a direction of flowing in from the output capacitor exceeds a predetermined threshold value in the dead time.

* * * * *